(12) United States Patent
Eder et al.

(10) Patent No.: US 8,527,674 B2
(45) Date of Patent: Sep. 3, 2013

(54) DATA PACKET SWITCHING

(75) Inventors: Stefan Eder, Grafenau (DE); Friedrich Geissler, Wolfratshausen (DE); Chia-Sheng Lu, Hsinchu (TW)

(73) Assignee: Lantiq Deutschland GmbH, Neubiberg (DE)

( * ) Notice: Subject to any disclaimer, the term of this patent is extended or adjusted under 35 U.S.C. 154(b) by 1731 days.

(21) Appl. No.: 11/683,467

(22) Filed: Mar. 8, 2007

(65) Prior Publication Data
US 2009/0190588 A1 Jul. 30, 2009

(51) Int. Cl.
G06F 3/00 (2006.01)
G06F 5/00 (2006.01)
G06F 13/00 (2006.01)

(52) U.S. Cl.
USPC ................... 710/38; 710/31; 710/52

(58) Field of Classification Search
USPC ............................. 710/52, 31, 38
See application file for complete search history.

(56) References Cited

U.S. PATENT DOCUMENTS

| | | | | |
|---|---|---|---|---|
| 5,394,402 A * | 2/1995 | Ross | ............................... | 370/402 |
| 5,617,421 A * | 4/1997 | Chin et al. | ..................... | 370/402 |
| 6,084,856 A * | 7/2000 | Simmons et al. | ............. | 370/235 |
| 6,085,238 A * | 7/2000 | Yuasa et al. | ..................... | 709/223 |
| 6,137,797 A * | 10/2000 | Bass et al. | ...................... | 370/392 |
| 6,246,680 B1 * | 6/2001 | Muller et al. | .................. | 370/389 |
| 6,765,914 B1 * | 7/2004 | Jain et al. | .................. | 370/395.31 |
| 2004/0017772 A1 * | 1/2004 | Saito et al. | ..................... | 370/229 |
| 2006/0023724 A1 * | 2/2006 | Na et al. | ..................... | 370/395.53 |
| 2006/0274771 A1 * | 12/2006 | Doi | ................. | 370/408 |
| 2007/0070895 A1 * | 3/2007 | Narvaez | ........................ | 370/230 |
| 2007/0121499 A1 * | 5/2007 | Pal et al. | ........................ | 370/230 |

OTHER PUBLICATIONS

Seifert, Rich, The Switch Book—The Complete Guide to Lan Switching Technology John Wiley & Sons, Inc. in New York 2000 pp. 63-64.*

* cited by examiner

*Primary Examiner* — Farley Abad
(74) *Attorney, Agent, or Firm* — SpryIP, LLC

(57) ABSTRACT

Embodiments related to switching of data packets have been described.

8 Claims, 16 Drawing Sheets

| DA-unicast | DA non-unicast | Forwarding rule |
|---|---|---|
| In MAC table | NA | Forward only to port 130 |
| Not in MAC table | NA | Forward only to port 120 |
| NA | In MAC table | Forward to port 120 and 130 |
| NA | Not in MAC table | Forward only to port 120 |

| Destination address | VLAN ID | Forwarding rule |
|---|---|---|
| DA | V1 & V2 | Forward to port 120 and 130 |
| DA | V1 & $\overline{V2}$ | Forward only to port 130 |
| DA | $\overline{(V1 \& V2)}$ | discard |
| DA | $(\overline{V1} \& V2)$ | Forward only to port 120 |
| $\overline{DA}$ | V2 | Forward only to port 120 |
| $\overline{DA}$ | $\overline{V2}$ | discard |

DA = set of entries in the MAC table (unicast & non-unicast entries)
V1 = set of VLAN IDs port 130 is a member of
V2 = set of VLAN IDs port 120 is a member of

Fig. 4a

| Destination address | VLAN ID | Forwarding rule |
|---|---|---|
| DA-U | V1 | Forward only to port 130 |
| DA-U | $\overline{V1}$ | discard |
| $\overline{DA\text{-}U}$ | V2 | Forward only to port 120 |
| $\overline{DA\text{-}U}$ | $\overline{V2}$ | discard |
| DA-NU | V1 & V2 | Forward to port 120 and 130 |
| DA-NU | V1 & $\overline{V2}$ | Forward only to port 130 |
| DA-NU | $\overline{V1}$ & $\overline{V2}$ | discard |
| DA-NU | $\overline{V1}$ & V2 | Forward to port 120 |
| $\overline{DA\text{-}NU}$ | V2 | Forward only to port 120 |
| $\overline{DA\text{-}NU}$ | $\overline{V2}$ | discard |

DA-U = unicast entry in the MAC table
DA-NU = set of non-unicast entries in the MAC table
V1 = set of VLAN IDs port 130 is a member of
V2 = set of VLAN IDs port 120 is a member of

Fig. 4b

DATA PACKET SWITCHING

BACKGROUND

Switching of data packets in networks such as in LANs (Local Area Networks), catenets, WANS (Wide Area Networks) is one of the crucial elements in the design and operation of data communication over these networks. Various sort of switching devices are known in the field. For example, in shared communication networks, repeater or hubs may be used to forward each data packet received to each of the other ports. Switching devices at level 2 of the OSI model are sometimes referred to as switches or bridges, switching devices at level 3 of the OSI model are sometimes referred to as routers.

BRIEF DESCRIPTION OF THE SEVERAL VIEWS OF THE DRAWINGS

FIG. 4a-c show forwarding tables and a graphical representation of VLAN identification sets according to an embodiment of the present invention.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. are given the same reference number.

Figure 1:
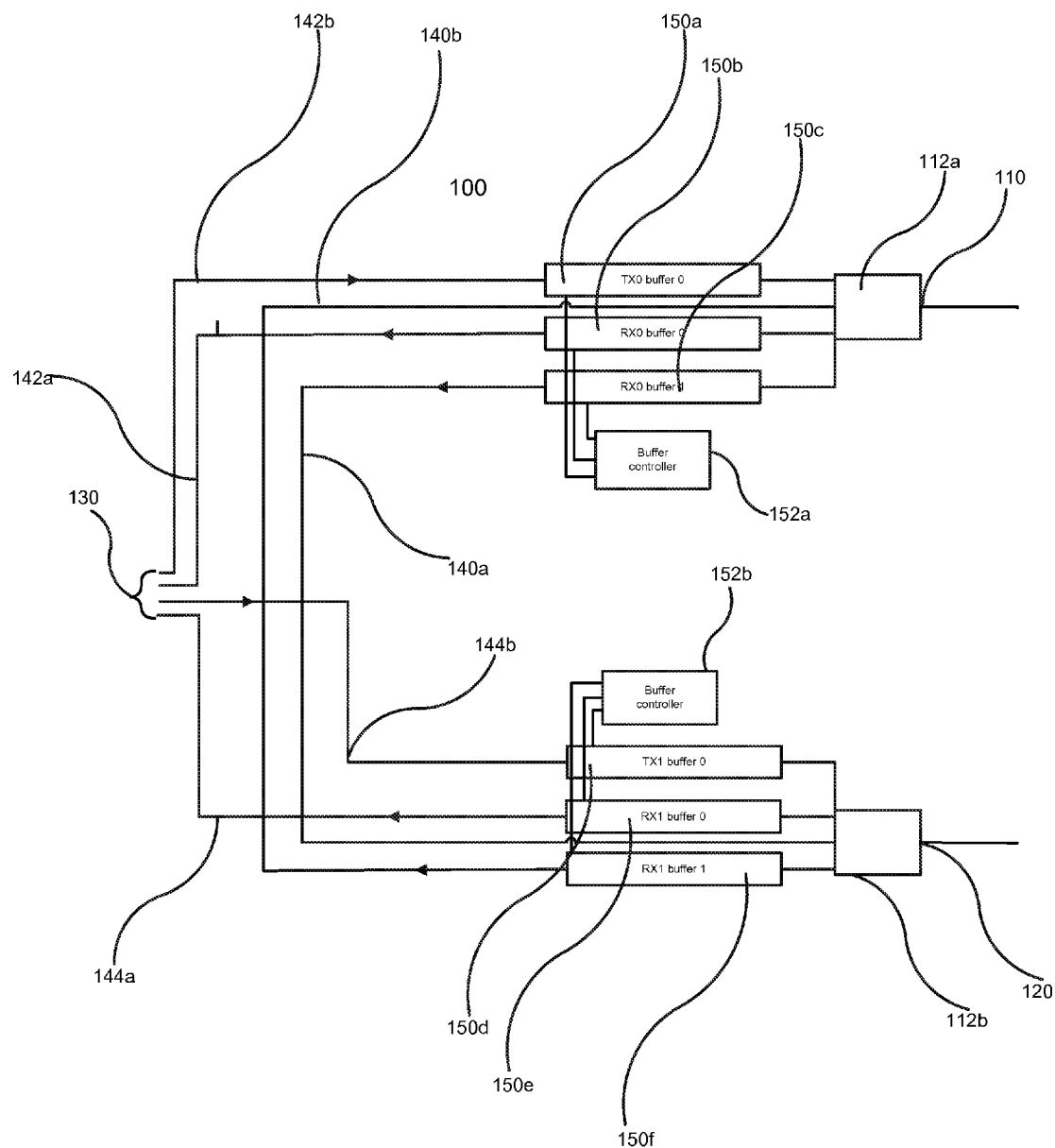
FIG. 1 shows a block diagram according to an embodiment of the present invention.

Referring to FIG. 1, a switching device 100 according to an embodiment of the present invention is a 3-Port switching device comprising a port 110, a port 120 and a port 130. The ports 110, 120, 130 receive data packets from external data sources outside the switch and provide the data packets via internal connections to other ports for transmitting the data packets to other external data sources. For the internal data communication, the port 110 and port 120 are coupled via a data communication link comprising a data connection 140a for data communication from the port 110 to the port 120 and a data connection 140b for data communication from the port 120 to the port 110. A further internal data communication link of the switching device 100 comprises a data connection 142a for data communication from the port 110 to the port 130 and a data connection 142b for data communication from the port 130 to the port 110. For internal communication between the port 120 and the port 130, a communication link comprises a data connection 144a for data communication from the port 120 to the port 130 and a data connection 144b for data communication from the port 130 to the port 120. Thus, the switching devices provides data links to selectively transfer data from each port to all other ports as will be described below.

In the embodiment according to FIG. 1, a plurality of physically separate buffers is provided for each of the internal data connections. To be more specific, a first plurality of buffers 150a, 150b and 150c is associated with the port 110 and a second plurality of buffers 150d, 150e and 150f is associated with the port 120. Each of the first plurality of buffers is coupled to a first buffer controller 152a and each of the second plurality of buffers is coupled to a second buffer controller 152b. While the embodiment according to FIG. 1 shows one implementation of buffer control, it is to be understood that other controlling configurations for controlling the plurality of buffers may be implemented in other embodiments. For example, a single buffer controller may be provided for controlling all of the buffers 150a to 150f. It is to be noted that the buffer structure shown may be provided in one memory wherein each of the buffers is associated with a predetermined domain or subset of the memory. Each of the buffer is assigned to a predefined size of the memory, such that a respective buffer has the predefined size reserved within the memory which can not be used by other buffers. In other words, distinguished from conventional switches, in the above buffer structure, each buffer is specified within the memory regarding the size and the physical or logical allocation providing for a logical separation of the buffers within the memory. In another embodiment of the invention the different logical buffers may also be implemented as physically separate memories.

Each of the buffers 150a to 150f is dedicated to store data of data packets transmitted on the data communication associated with the respective buffer. According to the dedicated buffer structure, data transmitted on an internal data communication is stored only in the associated dedicated buffer and no data storage in buffers other than the dedicated buffer is provided resulting in a non-shared buffer memory structure for the internal data communication of the switching device.

While the embodiment shown in FIG. 1 provides a dedicated buffer for each of the internal data connections, it is to be noted that one or more of the plurality of buffers may be dedicated to more than one internal data connection resulting in a dedicated buffer structure with less than six separated buffers. Furthermore, while for each of the data connections one buffer may be provided, it is to be noted that according to embodiments for one or more data connections two buffers may be provided, one buffer being associated with the receiving port and one being associated with the transmitting port. For example, buffers 150c and 150f may be separated into two buffers.

Between the buffers 150 a-c and the port 110, circuitry 112a for implementing one or more functional entities or modules may be provided. Furthermore, circuitry 112b for implementing one or more functional entities may be provided between buffers 150d-f and the port 120. The functional entities provided between the buffers and the ports 110 and 120, respectively, may include circuits provided for full or partial MAC (Media Access Control) processing, LLC processing (logical link control), flow control of the data packets, address filtering of the data packets, prioritization of data packets, scheduling, multiplexing and demultiplexing of the data packets or data error checking.

Implementation of the circuitry 112a and 112b may vary dependent for example on the type of switching device, on the data packets switched by the switching device and the protocols used. It is to be noted here, that the switching device 100 may for example provide switching functionality at the level 2 of the OSI model, also referred in the art as "bridging", or switching functionality at level 3 or higher levels of the OSI model, also referred in the art as "routing". According to one embodiment, the switching device may be implemented for switching frames, such as Ethernet frames.

According to one embodiment, the port 130 is directly coupled to the respective buffers, i.e. no functional blocks or entities are provided in hardware between the port 130 and the respective buffers coupled to the port 130. According to one embodiment, a reduced number of functional blocks compared to the functional blocks provided between the buffers and the ports 110 and 120 may be provided in hardware between the port 130 and the respective buffers. According to embodiments, no MAC circuitry is provided for the third port. While the switching device provides multiplexing of the data packets for the ports 110 and 120 received via the plurality of internal data connections to a single external transmit data stream and demultiplexing for the ports 110 and 120 of a single external receive data stream to the plurality of internal data connections, no multiplexing circuits are provided in hardware for the third port. Thus, the port 130 may comprise four external parallel data stream connections corresponding to each of the four internal data connections 142a, 142b, 144a, 144b while the external interface of the ports 110 and 120 may each provide only one external data connection where data are transmitted in one data stream.

According to one embodiment, the port 130 may be associated with a data connection to a data sink/source. The data sink/source may be provided on a same board or on the same chip as the switching device 100. The data sink/source may according to embodiments be a DMA (direct memory controller) or a CPU. The data sink/source may be coupled to directly access the buffers provided in the switching device 100.

According to one embodiment, the data sink/source is a circuit dedicated for processing the data packets transferred to the port 130. According to one embodiment, the data packets transferred to the port 130 contain VoIP (voice over IP) data and the data sink may be a VoIP processor or a DMA coupled to a VoIP processor.

The buffers provided in the switching device 100 may have different memory sizes. According to one embodiment, the buffer structure of the first plurality is identical to the buffer structure of the second plurality, i.e. the buffers 150a, 150b, 150c may have the same size as the buffers 150d, 150e, 150f, respectively. According to one embodiment, the size of the buffers 150a and 150d provided for buffering the data packets transferred from the port 130 to the ports 110 and 120, respectively, may be provided to guarantee buffering of a full data packet. Thus, the size may be equal or slightly higher than the maximum allowable size of data packets switched by switching device 100. For example, according to one embodiment, the maximum allowable Ethernet frame size may be 1518 bytes for untagged and 1522 bytes for tagged Ethernet frames. According to another embodiment, the maximum allowable Ethernet frame may be 2000 bytes. Thus, according to one embodiment, 1518 bytes or 1522 bytes may be provided for the memory size of buffers 150a and 150d while according to another embodiment 2000 bytes may be provided for the memory size of buffers 150a and 150d. However, in other embodiments, the size may be different.

According to embodiments, the buffers 150b and 150e provided for buffering data packets transferred from the port 110 and the port 120 to the port 130 may have a size to guarantee buffering of one data packet. Thus, the size of buffers 150b and 150e may be equal or slightly higher than the maximum allowable size of data packets switched by the switching device 100, for example 1518, 1522 or 2000 bytes.

Furthermore, the buffer 150c provided for buffering data packets transferred from the port 110 to the port 120 and the buffer 150f provided for buffering data packets transferred from the port 120 to the port 110 may be selected to guarantee buffering of three data packets. Thus, the size of buffers 150c and 150f may be equal or slightly higher than three times the maximum allowable size of data packets switched by the switching device 100, for example 6000 bytes or higher than 6000 bytes but less than 8000 bytes.

According to one embodiment, with the above buffer structure, a prioritization scheme and flow control for the buffer structure may be provided as will be described below.

Furthermore, a destination address filtering according to an embodiment may be provided for the switching device 100 as set forth below.

Figure 2:
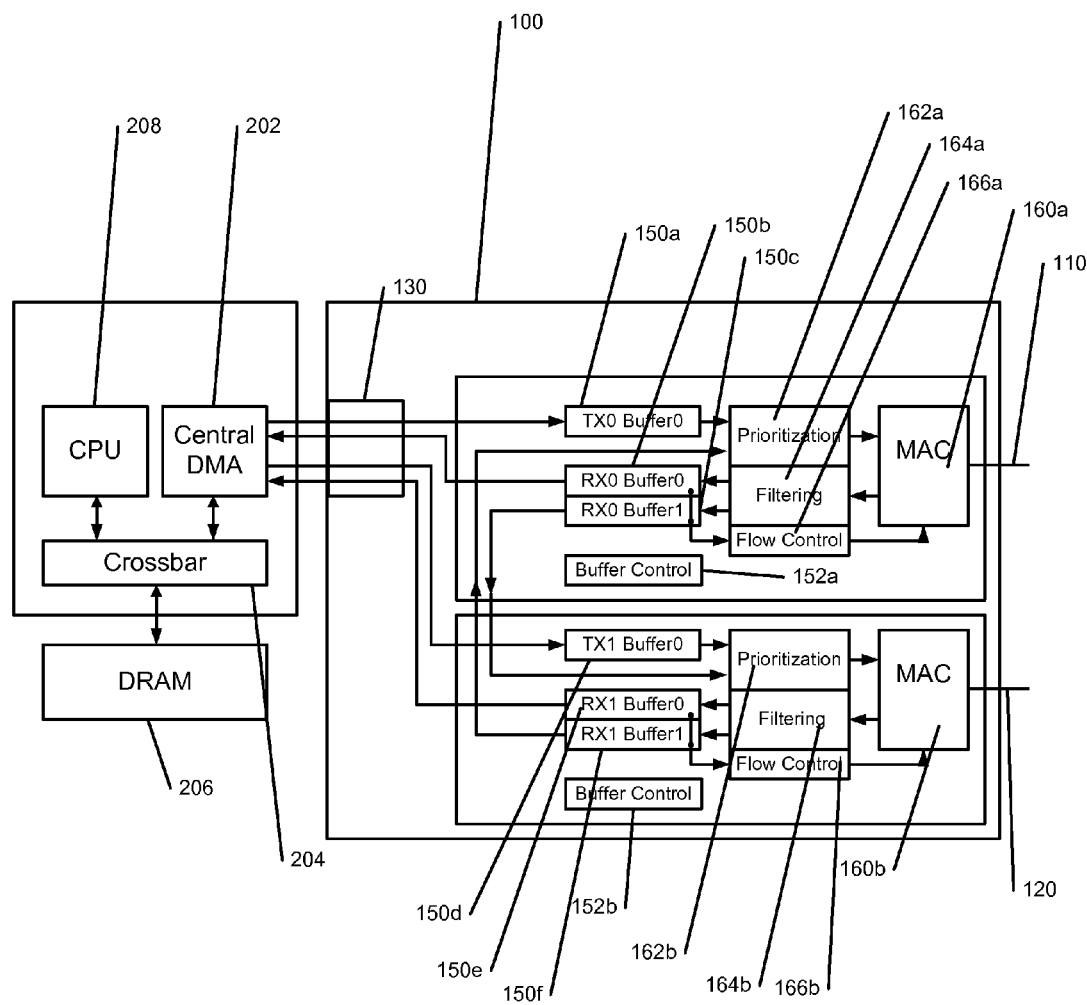
FIG. 2 shows a block diagram according to an embodiment of the present invention.

FIG. 2 shows the switching device 100 comprising a plurality of functional entities between the buffers 150a to 150e and the port 110 and port 120, respectively. It is to be understood that the functional entities described with respect to FIG. 2 are only exemplary and other embodiments may provide less or additional entities between the buffers and the ports 110 and 120. It is further to be noted that the entities shown may be implemented fully in hardware, or by a combination of hardware with firmware or software. Furthermore, it is to be noted that part of the circuits provided for one entity may also be used for another entity.

In more detail, in the switching device according to FIG. 2, MAC entities 160a and 160b are coupled to the ports 110 and 120, respectively. Prioritization entities 162a and 162b are coupled to the MAC entities 160a and 160b, respectively to provide priority processing for the data packets to be transferred via the port 110 and the port 120 to external networks or external devices. An exemplary priority processing of the prioritization entities 162a and 162b will be explained below. The prioritization entity 162a is coupled to the buffers 150a and 150f to receive the data packets from the ports 120 and 130 for external transmission via the port 110. Furthermore, the prioritization entity 162b is coupled to the buffers 150d and 150c to receive the data packets from the ports 110 and 130 for external transmission via the port 120.

Furthermore, filtering entities 164a and 164b coupled to the MAC entities 160a and 160b, respectively, are provided in the switching device 100 according to FIG. 2. The filtering entities provide address filtering or VLAN filtering for data packets received at the ports 110 and 120 to selectively decide to which of the ports a data packet is to be transferred. To this end, the filtering entity 164a is coupled to the buffers 150b and 150c and the filtering entity 164b is coupled to the buffers 150e and 150f.

It is to be noted that according to one embodiment, no filtering entity is provided in hardware in the switching device 100 according to FIG. 2 for data packets received at the port 130. It is further to be noted that according to the embodiment of FIG. 2, the address filtering is not integrated in the MAC entities 160a and 160b but is provided separate from the MAC entities in the filtering entities 164a, 164b.

It is further to be noted that the switching device 100 can be operated according to one embodiment without providing the conventional look-up, learning and aging functions for the MAC table.

In the switching device 100 according to FIG. 2, flow control processing of the receiving data stream is provided for each of the ports 110 and 120 by flow control entities 166a and 166b. To this end, the flow control entity 166a associated with the port 110 is coupled to the buffers 150b and 150c and the MAC entity 160a and the flow control entity 166b associated with the port 120 is coupled to the buffers 150e and 150f and the MAC entity 160b.

In FIG. 2, the switching device 100 is shown to be connected via the port 130 to an exemplary data sink/source comprising a central DMA controller 202 coupled via a crossbar structure 204 to a RAM memory 206, which may be for example implemented as a DDR SDRAM memory. Furthermore a CPU 208 is coupled via the crossbar structure 204 to the RAM memory 206 to have access to the data stored in the RAM memory 206 and to process the data. According to one embodiment, the DMA controller 202, the RAM memory 206 and the CPU 208 may be part of a voice processing circuitry implemented to process VoIP data packets providing audio signals based on the data packets transferred to the third port. According to other embodiments, the RAM memory 206 and the CPU 208 may be part of an audio and video processing circuitry implemented to provide audio and video signals or digital TV signals based on the data packets transferred to the third port.

As shown in FIG. 2, the DMA controller 202 is coupled via four data connections to the port 130 and to each of the buffers 150*a*, 150*b*, 150*e* and 150*f* allowing a direct access of the DMA controller 202 to the buffers 150*a*, 150*b*, 150*e* and 150*f*.

In the following, exemplary embodiments of the operation of the switching device 100 are provided. While the description of the exemplary embodiments of operation will be provided with respect to the embodiment according to FIG. 2, it is to be understood that the operations may be provided also in other embodiments of the switching device 100.

Figure 3A:
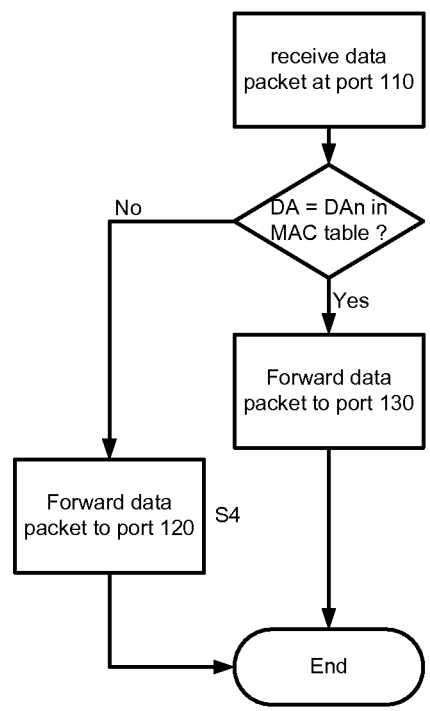
FIGS. 3a-h and 3j-m show flow diagrams and block diagrams according to embodiments of the present invention.
Figure 3B:
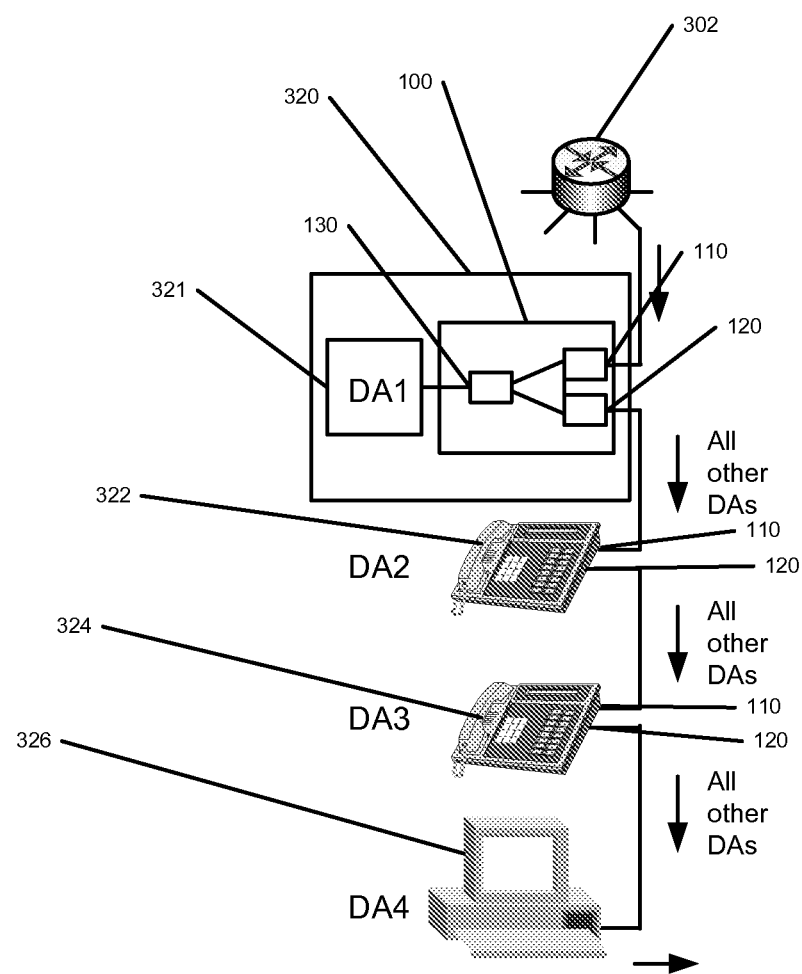

Referring to FIGS. 3*a* and 3*b*, an operation of the switching device 100 associated with a VLAN unaware mode where VLAN addresses are not supported will be described. VLAN unaware mode may be provided when the data packets do not contain VLAN tags or when the switch is configured to be operated in the VLAN unaware mode.

FIGS. 3*a* and 3*b* refer to a VLAN unaware operation mode, where only one unicast MAC address DAn is permanently stored in a MAC table of the filtering entity. The index n for the destination address DAn indicates that for different switches the destination address stored can be different. In the operation according to FIGS. 3*a* and 3*b*, at S0, a data packet is received at the port 110 from a router 302 or other network or LAN devices connected to the port 110. The data packet is processed by the MAC entity 160*a* and provided to the filtering entity 164*a* parsing the destination address of the data packet. As described above, a MAC table of the switching device comprises only one unicast entry, i.e. the unicast MAC address associated with the data sink/source coupled to the port 130. It is to be noted that according to one embodiment, the MAC table comprises the unicast address associated with the port 130 but no other unicast addresses while other non-unicast addresses may be provided in the MAC table as will be described below. At S1, the destination address of the data packet is compared to the unicast MAC address DAn provided in the MAC table. If the destination address of the data packet matches the unicast MAC address, the data packet is forwarded at S2 to the port 130 and the process ends at S3. As described above with respect to FIGS. 1 and 2, the data may be buffered in buffer 150*b* for transmission from port 110 to port 130. If the destination address of the data packet does not match the unicast address associated with the data sink/source, the data packet is forwarded at S4 to the port 120 and the process ends at S3. Thus, all data packets having a destination address not matching the single unicast MAC address in the MAC table are transferred to the port 120 independent whether the destination address actually matches the destination address of one of the devices coupled to the port 120 or not. Or in other words, distinguished from conventional lookup processes in the MAC table, only the MAC address corresponding to port 130 is filtered and the traffic is forwarded to this port accordingly while all other traffic is exchanged between the ports 110 and 120. Furthermore, as will be described below in more detail, multicast, broadcast or reserved addresses can be selectively forwarded to port 130, while they are always forwarded from port 110 to port 120 and vice versa.

FIG. 3*b* shows an exemplary system configuration of a first VoIP-phone 320 comprising the switching device 100 in order to explain the above filtering. In FIG. 3*b*, three external devices, a VoIP phone 322, a VoIP phone 324 and a device 326 such as a PC (personal computer) are coupled to the port 120 of switching device. It is to be noted that in the system shown in FIG. 3*b*, although not shown therein, the VoIP phones 322 and 324 comprise the switching device 100 similar to the VoIP phone 320.

Data packets from a networking device 302 are received at the port 110 of the switching device 100 of the first VoIP phone 320 and are transmitted to a data sink/source 321 coupled to the port 130 if the destination address of the data packets matches the unicast destination address DA1 of the first VoIP phone or one of the non-unicast MAC addresses enabled for the port 130. As can be seen in FIG. 3*b*, the data sink/source is implemented in the VoIP phone 320 to process the VoIP datas to provide audio signals for a user. As outlined above, the data sink/source 321 may according to one embodiment be a VoIP processing circuit or a CPU of the VoIP phone which may be provided on a same board or a same chip.

Data packets with non-unicast destination address are always transmitted to port 120 of the switching device 100 of the first VoIP phone 320 irrespective if the same packet is also sent to port 130 in parallel.

From the port 120, the data packets are then transmitted to the second VoIP phone 322 and are received at the port 110 of the switching device of the second VoIP phone 322, which is not shown in FIG. 3*b*. Similar to the first VoIP phone 320, the data packets received at the port 110 of the switching device of the second VoIP phone 322 are transmitted to port 130 coupled to the VoIP processing circuit, if the destination address of the data packets matches the unicast destination address DA2 of the second VoIP phone. All data packets with destination addresses different from the unicast destination address DA2, i.e. the complement of DA2, are transmitted to the port 120 of the switching device of the second VoIP phone 322.

From the port 120 of the second VoIP phone 322, the data packets are then transmitted to the port 110 of the third VoIP phone 324. Similar to the first and second VoIP phones 320 and 322, the data packets received at the port 110 of the third VoIP phone 324 are transmitted to port 130 coupled to the VoIP processing circuit, if the destination address of the data packets matches the destination address DA3 of the third VoIP phone. All data packets with destination addresses different from the destination address DA3, i.e. the complement of DA3, are transmitted to the port 120 of the third VoIP phone 324.

From the port 120 of the third VoIP phone 324, the data packets are then transmitted to the device 326. The device 326 checks whether the destination address of the received data packets matches the unicast MAC address associated with device 326. If so, the device 326 will process the data packets. If the destination address of the received data packets does not match the unicast MAC address of device 326, the data packets will be discarded.

As described above, the MAC table comprises in the operation mode according to FIGS. 3*a* and 3*b* only one entry of a unicast address. However, according to one embodiment, in addition to the one unicast address, one or more non-unicast addresses such as multicast addresses, broadcast addresses or other non-unicast addresses may be stored in the MAC table.

In this embodiment, not only data packets comprising an address matching the unicast address of the MAC table but also data packets comprising an address matching one of the non-unicast addresses of the MAC table are transferred to the third port. In addition, these data packets are transferred also to the port 120.

Figures 3C, 3D:
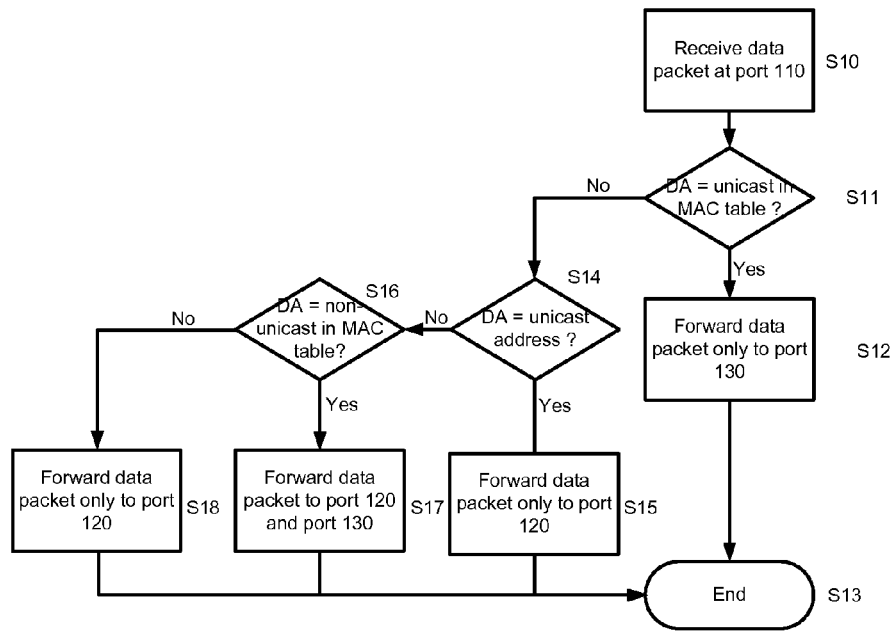

Referring now to FIG. 3c, an embodiment is described where the port forwarding decision is not only dependent on whether the destination address matches the unicast address provided in the MAC table but also on whether the destination address is a unicast address or not.

In the flow diagram according to FIG. 3c, the data packet is received at port 110 at S10. At S1, it is determined whether the destination address matches the unicast address provided in the MAC table. If this is true, the data packet is forwarded only to port 130 at S12 and the process ends at S13. If the address is determined not to match the unicast address, it is determined at S14 whether the destination address is a unicast address. If this is true, the data packet is forwarded only to port 120 at S15 and the process ends at S13. If the destination address is determined at S14 not to be a unicast address, it is determined at S16 whether the destination address is a non-unicast address provided in the MAC table of the switching device. If this is true, the data packet is forwarded at S17 to both ports 120 and 130. If this is not true, the data packet forwarded at S18 only to port 120.

The forwarding table achieved by the process according to FIG. 3c is shown in FIG. 3d. As can be seen, similar to the process according to FIG. 3a, no data packets are discarded, i.e. all data packets are transferred to one or both of ports 120 and 130. The port forwarding as described above provides a filtering of the unicast destination address with respect to port 130 and transfers all other data packets to port 120. In addition, data packets with non-unicast destination addresses may optionally be transferred also to port 130 if the non-unicast address of the data packet is stored in the MAC table.

With respect to FIGS. 3e and 3f, a further embodiment corresponding to a VLAN unaware operation mode will be described. In the VLAN unaware mode according to FIGS. 3e and 3f, the MAC address table comprises more than one unicast address, for example the unicast addresses DA1 associated with the port 130 and a unicast address DA2 associated with the port 120.

Data packets matching the unicast address DA1 are transferred to the third port. Distinguished from the operation mode according to FIGS. 3a and 3b, data packets having a unicast address are only transferred to the port 120, if the unicast address matches the unicast address DA2 in the MAC list. Data packets having a unicast address not matching the unicast address DA1 and DA2 are discarded and will not be send to a port. Otherwise the operation is similar to the operation mode described with respect to FIGS. 3a and 3b.

Furthermore, as described for the above embodiments, the MAC table may comprise in addition to the unicast addresses non-unicast addresses. Data packets having a non-unicast address matching an entry in the MAC table will then be transferred to both, the port 130 and the port 120, while data packets having a non-unicast address not matching an entry in the MAC table will be provided only to the port 120. Thus, while all data packets with non-unicast addresses are always transferred to the port 120, the entries of non-unicast addresses in the MAC table provide a selection which data packets with non-unicast addresses are to be transferred to the third port.

Figure 3E:
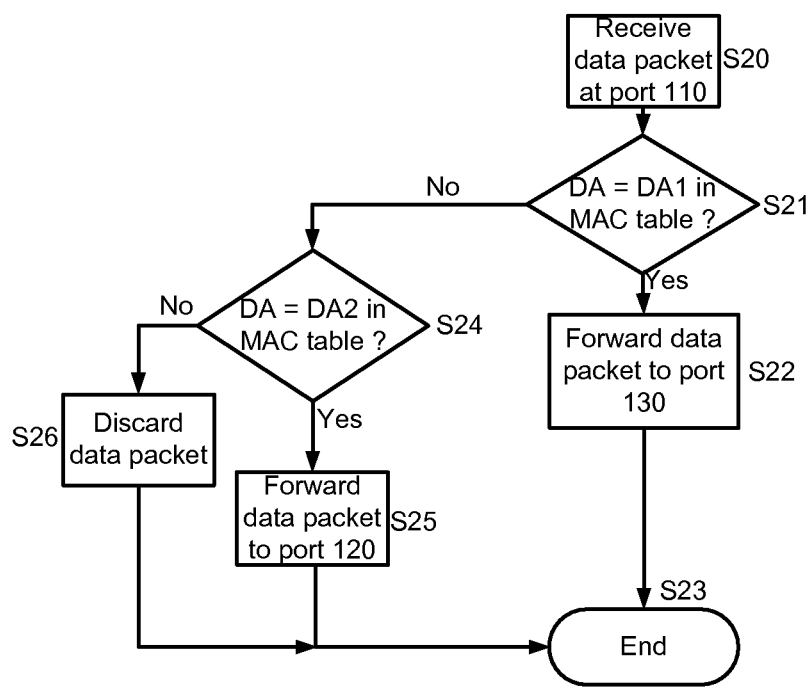

Referring in detail to FIG. 3e, a data packet is received at port 110 at S20. It is determined at S21 whether the data packet has a destination address (DA) matching the destination address DA1 provided in the MAC table. If this is true, the data packet will be forwarded at S22 to the port 130 and the process ends at S23. If the destination address DA does not match DA1, it is determined at S24 whether the destination address DA matches DA2. If this is true, the data packet is forwarded to port 120 at S25 and the process ends at S23. Otherwise, the data packet is discarded at S26 and the process ends at S23.

Figure 3F:
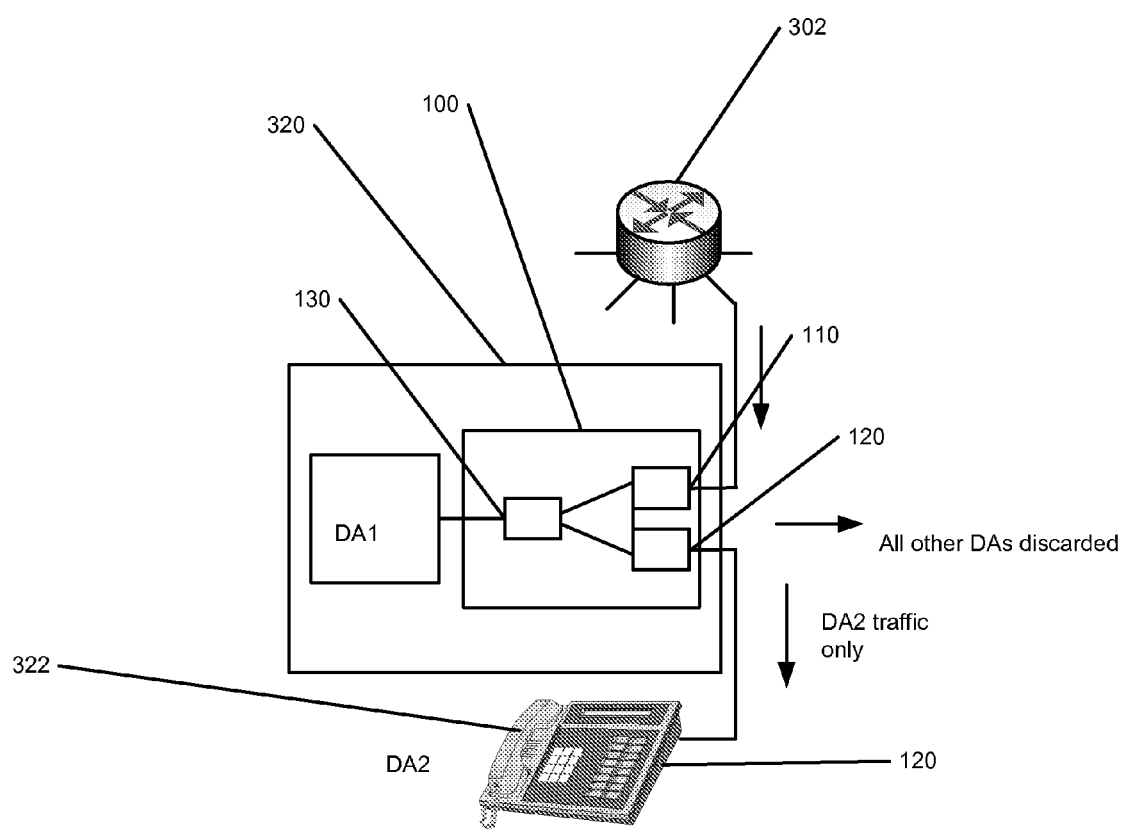

FIG. 3f shows an embodiment of a system comprising VoIP phones 320 having the switching device 100 implemented. Similar to the embodiment described above, in the VoIP phone 320 a data sink/source is coupled to the port 130. The VoIP phone 320 is coupled at the port 120 to a further VoIP phone 322 associated with the second destination address DA2. In operation, the switching device 100 of VoIP phone 320 receives data packets from a network coupled to port 110, for example via a network device such as a router connected to port 110. The destination address of the data packets are parsed and data packets are transferred to port 130 if the destination address of the data packets match the destination address entry DA1 in the MAC table. Packets with destination addresses matching the destination address entry DA2 in the MAC table are transferred to port 120. From port 120, the data packets are then transferred to the VoIP phone 322. Data packets having a destination address not matching the destination address entries DA1 or DA2 are discarded. While in the operation mode according to FIGS. 3a and 3b only the traffic to port 130 is selected with respect to the destination addresses DA1, the operation mode according to FIGS. 3e and 3f provides selectivity for both ports 120 and 130 based on the destination addresses DA1 and DA2. It is to be noted that according to embodiments the destination address DA1 or the destination addresses DA1 and DA2 are predetermined and are permanently maintained in the MAC table.

Operation modes of the switching device 100 corresponding to a VLAN aware operations will now be described in the following. In VLAN aware operation, the decision to which ports data packets are forwarded is made dependent on the VLAN to which the data packets belongs, i.e. the VLAN tag of the data packets, for example the VLAN identification provided in the data packet. VLAN aware operation may comprise core network operation having the port forwarding decision based only on the VLAN identification independent of the destination address of the data packets or operation modes having the port forwarding decision based on the destination address and the VLAN identification of the data packets.

Furthermore, the switching device 100 may also implement VLAN tagging or VLAN untagging for the data packets received or transmitted via the ports of the switching device. VLAN tagging refers to inserting VLAN information, such as a VLAN tag, into the data packets while VLAN untagging refers to removing of VLAN information from the data packets as for example provided by the IEEE 802.1Q standard. Both operations, VLAN tag insertion and removal, are provided by the switching device 100 with a recalculation of the Frame Check Sequence (FCS).

Figure 3G:
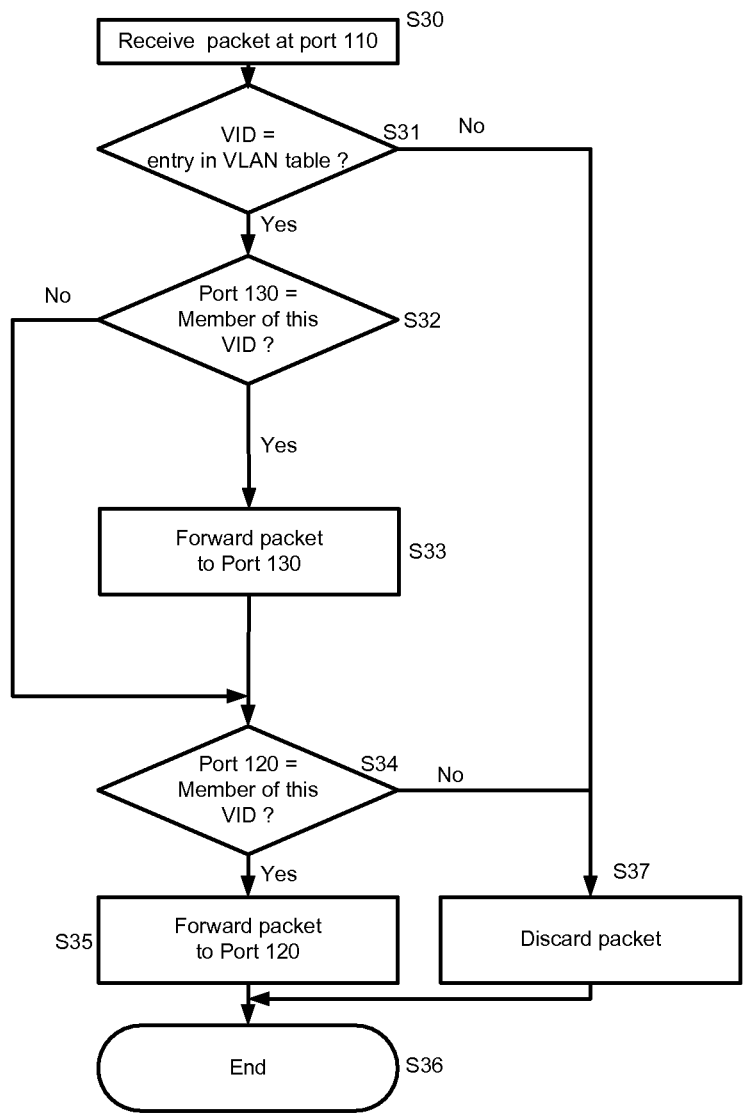
Figure 3H:
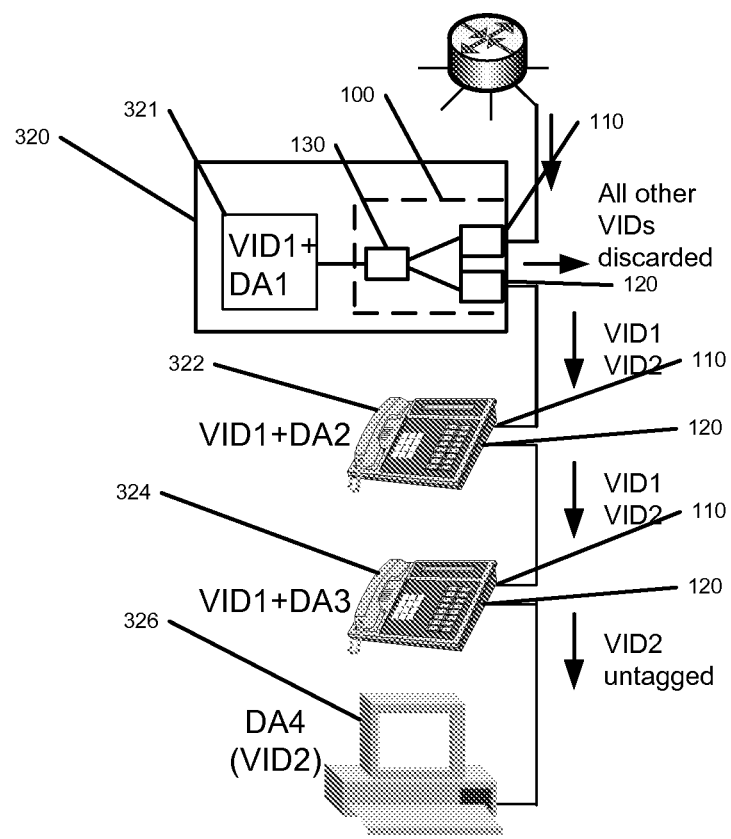

Referring now to FIGS. 3g and 3h, exemplary embodiments for core network operations in VLAN aware mode are described. As described above, in core network operations the port forwarding decision is based only on the VLAN identification of the data packet. To this end, the ports of the switching device 100 are associated or assigned to one or more VLAN identifications. Or in other words, a port may be a member of one or more of the entries in the VLAN table. In the embodiment described, two VLAN identifications VID1 and VID2 are stored in the VLAN table. In an exemplary embodiment, port 130 may be assigned to VID1 and ports 110 and 120 may be assigned to both, VID1 and VID2. In a further exemplary embodiment, all ports 110, 120 and 130 may be associated with both VLAN IDs VID1 and VID2. While the above embodiments are only exemplary, it is to be understood that many other assignments of the ports to the entries in the VLAN table may be provided in other embodiments.

Referring now to the exemplary forward decision process according to FIG. 3g, the process starts at S30 where a data packet is received at port 110. At S31, it is determined whether the VLAN identification VID of the data packet is one of the entries of the VLAN table. It is to be noted that according to one embodiment, step S31 may be omitted and the process may directly proceed from S30 to S32. If the result of decision S32 is true, then it is determined at S32 whether port 130 is a member of the VLAN identification VID of the data packet, i.e. whether port 130 is associated or assigned with the VLAN identification VID. If this is true, then the packet is forwarded at S33 to port 130 and process proceeds to S34. If this is not true, the process proceeds directly to S34. At S34 it is determined whether port 120 is a member of the VLAN identification VID of the data packet. If this is true then the data packet is forwarded to port 120 and the process ends at S36. If this is not true, the data packet is discarded at S37 and the process ends at S36. If it is determined at S31 that the identification VID is not one of the entries of the VLAN table, the process precedes also to S37 where the data packet is discarded.

FIG. 3h shows an exemplary system to illustrate an exemplary implementation of the above filtering process. Similar to the embodiment according to FIG. 3b, a VoIP phone 320 comprises a switching device having port 110 coupled to the network device 302 of a network such as a local area network or a wide area network. Furthermore, the port 120 of VoIP phone 320 is coupled to the port 110 of VoIP phone 322. The port 120 of VoIP phone 322 is coupled to port 110 of VoIP phone 324. The port 120 of VoIP phone 324 is coupled to device 326.

In the embodiment according to FIG. 3h, each of the data sink/sources implemented in the VoIP phones 320, 322 and 324 is a member of VLAN VID1 while device 326 is a member of VLAN VID2. Accordingly, each of the VLAN tables of the VoIP phones 320, 322 and 324 associate port 130 with VID1. Furthermore, in the VLAN tables of the VoIP phones 320 and 322, port 120 is associated with VID1 and VID2 while in the VLAN table of the VoIP phone 326, port 120 is associated only with VID 2.

In view of the above, data packets received from the network at port 110 of VoIP phone 320 are forwarded to port 130 when the data packet belongs to VLAN VID1. Data packets received from the network at port 110 of VoIP phone 320 are forwarded to port 120 when the data packet belongs to VLANs VID1 or VID2. Data packets belonging to VLANs other than the VLAN IDs VID1 and VID2 are discarded at the VoIP phone 320.

The data packets forwarded to port 120 of VoIP phone 320 are then transmitted to port 110 of VoIP phone 322. The VLAN table of VoIP phone 322 is identical to the VLAN table of VoIP phone 320 and therefore the port forwarding process for VoIP phone 322 is the same as described for the VoIP phone 320. Data packets forwarded to port 120 of the VoIP phone 322 are then transmitted to port 110 of the VoIP phone 324.

At the VoIP phone 324, data packets are forwarded to port 130 when the data packet belongs to VLAN VID1 and data packets are forwarded to port 120, when the data packet belongs to VLAN VID2. As indicated in FIG. 3h, the switching device implemented in VoIP phone 324 may provide untagging for the data packet forwarded to port 120 when the device 326 coupled to port 120 is a VLAN unaware device.

Further exemplary embodiments related to VLAN aware operation will now be described with respect to FIGS. 3j and 3k. Distinguished from the embodiments according to FIGS. 3g and 3h, the forwarding process described in FIGS. 3j and 3k is a switching where the port forwarding decision is based on a combination of the destination address and the VLAN identifications.

Figure 3J:
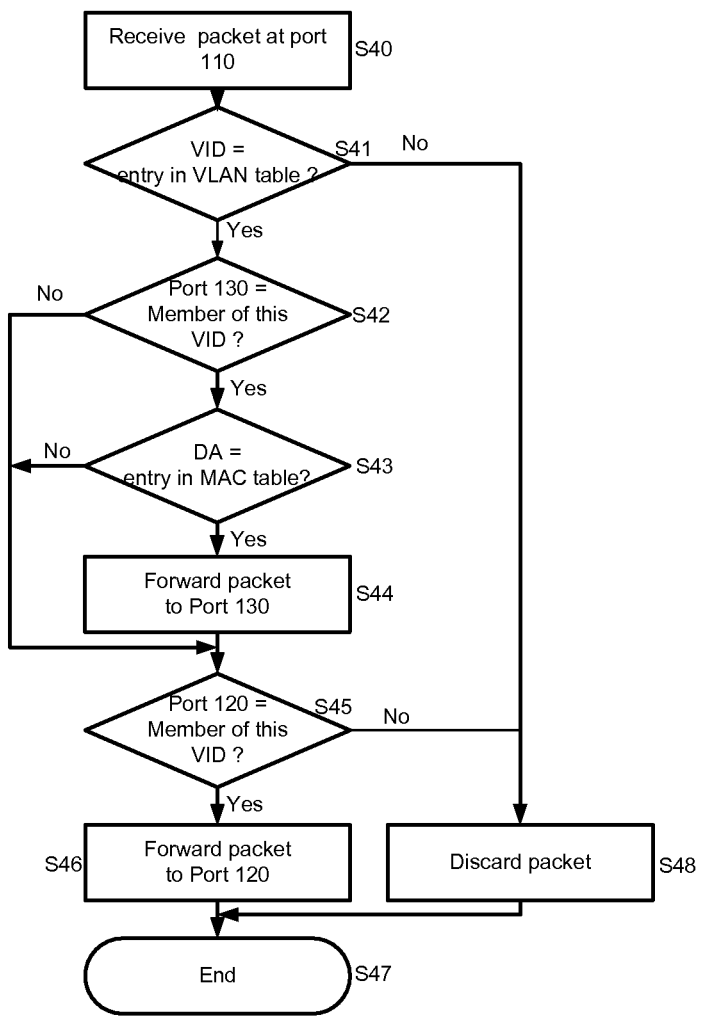
Figure 3K:
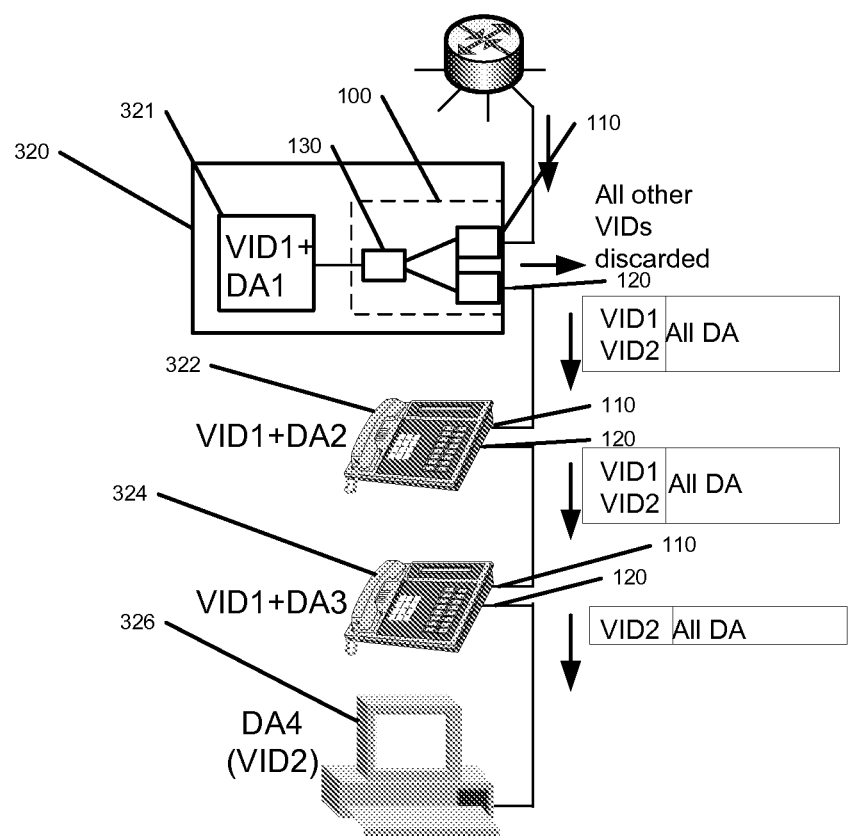
Figure 3I:
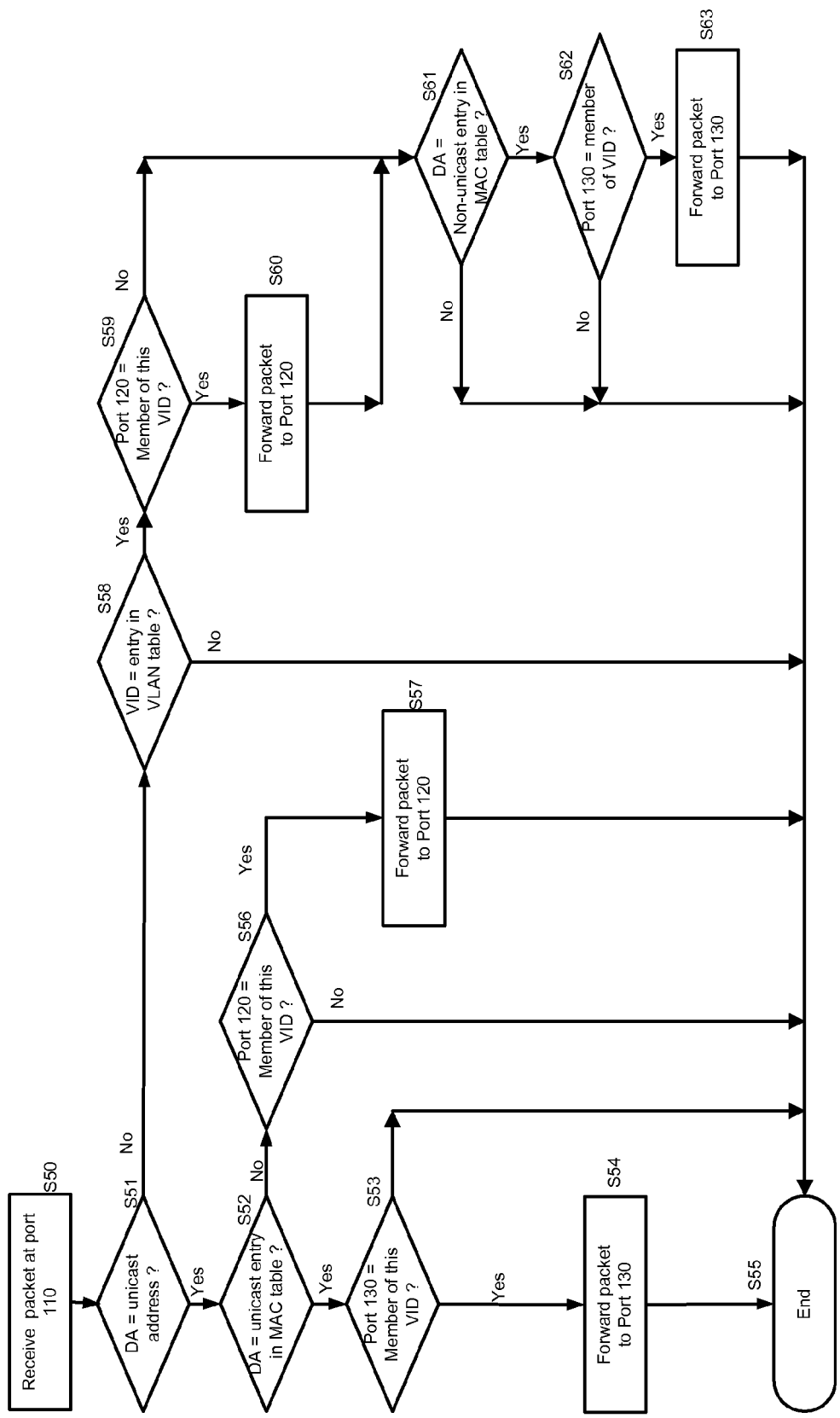

Referring to FIG. 3j, the process starts at S40 where a data packet is received at port 110. At S41, it is determined whether the VLAN identification VID of the data packet is one of the entries of the VLAN table. If S41 is determined to be true, then it is determined at S42 whether port 130 is a member of the VLAN identification VID of the data packet, i.e. whether port 130 is associated or assigned with the VLAN identification VID. If this is true, then it is determined at S43 whether the destination address matches an entry of the MAC table of the switching device. If this is true, the packet is forwarded at S44 to port 130 and the process proceeds to S45. If it is determined at S42 that port 130 is not a member of the VLAN identification, the process proceeds directly to S45. Also, if is determined at S43 that the destination address DA does not match an entry of the MAC table of the switching device, the process proceeds directly to S44. At S45 it is determined whether port 120 is a member of the VLAN identification VID of the data packet. If this is true then the data packet is forwarded to port 120 and the process ends at S47. If this is not true, the data packet is discarded at S48 and the process ends at S47. If it is determined at S41 that the identification VID is not one of the entries of the VLAN table, the process proceeds to S48 where the data packet is discarded.

It is to be noted that the entries in the MAC table includes the unicast destination address and may also include non-unicast destination addresses.

Figure 4C:
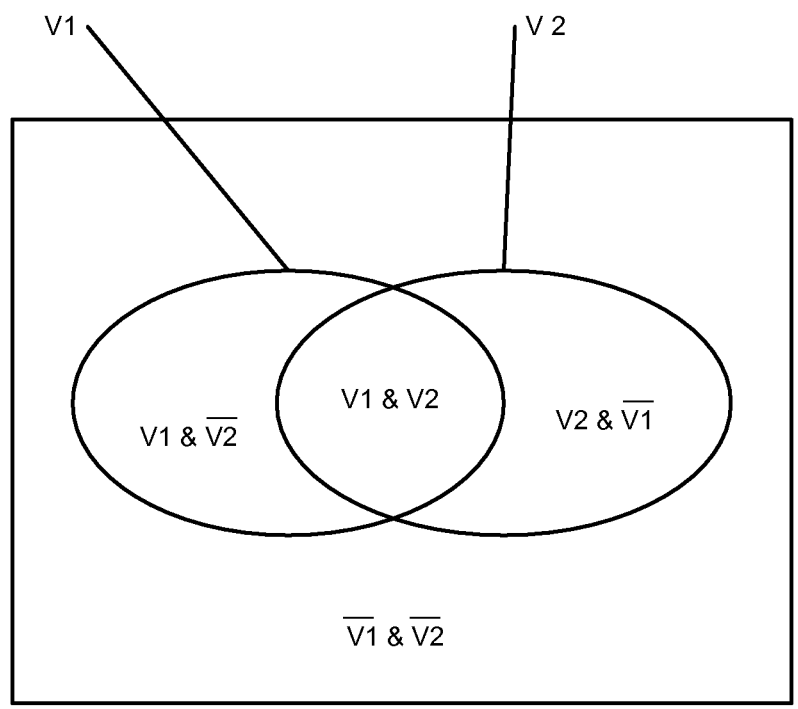

FIG. 4a shows a forwarding table of the port decision process according to FIG. 3j. In the table, V1 is a representative of the set of VLAN identifications that port 130 is a member of and V2 is a representative of the set of VLAN identifications that port 130 is a member of. It is to be noted that V1 and V2 may be disjunctive sets, i.e. VLAN IDs are only assigned to port 120 or port 130, or non-disjunctive sets that is V1 and V2 have entries which are common. FIG. 4c shows for better understanding a graphical representation of an embodiment where V1 and V2 are non-disjunctive set.

As can seen from FIG. 4a, if the destination address matches one of the entries of the MAC table and the ports 120 and 130 are a member of the VLAN identification of the data packet, the data packet is forwarded to ports 120 and 130. If the VLAN identification is a member of V1 but not a member of V2, the data packet is forwarded only to port 130. If the destination address matches one of the entries of the MAC table and neither port 130 nor port 120 is a member of the VLAN identification of the data packet, the data packet is discarded. If the destination address matches one of the entries of the MAC table and port 130 is not a member of the VLAN identification but port 120 is a member of the VLAN identification of the data packet, the data packet is forwarded only to port 120.

If the destination address does not match one of the entries of the MAC table, the data packet is forwarded to port 120, if port 120 is a member of the VLAN identification. In any other case, i.e. if port 120 is not a member of the VLAN identification, the data packet is discarded.

It is to be noted that according to this embodiment, port 130 receives only data packets having an entry in the MAC table provided that port 130 is a member of the VLAN identification of the data packet while port 120 receives data packets independent of whether the destination address is in the MAC table or not, provided that port 120 is a member of the VLAN identification of the data packet.

FIG. 3k shows an exemplary implementation of the above port forwarding.

In the embodiment according to FIG. 3k, each of the data sink/sources implemented in the VoIP phones 320, 322 and 324 is a member of VLAN VID1 while device 326 is a member of VLAN VID2. Accordingly, each of the VLAN tables of the VoIP phones 320, 322 and 324 associate port 130 with VID1. Furthermore, in the VLAN tables of the VoIP phones 320 and 322, port 120 is associated with VID1 and VID2 while in the VLAN table of the VoIP phone 326, port 120 is associated only with VID 2. The data sink/source of the VoIP phones 320, 322 and 324 have destination addresses DA1 and DA2, DA3 and device 326 has a destination address DA4.

Data packets received from the network at port 110 of VoIP phone 320 are forwarded to port 130 when the data packet belongs to VLAN VID1 and the destination address matches DA1. Data packets received from the network at port 110 of VoIP phone 320 are forwarded to port 120 when the data packet belongs to VLANs VID1 or VID2. Data packets belonging to VLANs other than the VLAN IDs VID1 and VID2 are discarded at the VoIP phone 320.

The data packets forwarded to port 120 of VoIP phone 320 are then transmitted to port 110 of VoIP phone 322. The VLAN table of VoIP phone 322 is identical to the VLAN table of VoIP phone 320 while the MAC table contains DA2 instead of DA1. Data packets are then forwarded to port 130 when the data packet belongs to VLAN VID1 and the destination address matches DA2. Data packets are forwarded to port 120 when the data packet belongs to VLANs VID1 or VID2. Data packets forwarded to port 120 of VoIP phone 322 are then transmitted to port 110 of VoIP phone 324.

At VoIP phone 324, data packets are forwarded to port 130 when the data packet belongs to VLAN VID1 and the destination address matches DA3. Data packets are forwarded to port 120, when the data packet belongs to VLAN VID2. As indicated in FIG. 3k, the switching device implemented in VoIP phone 324 may provide untagging for the data packet forwarded to port 120 when the device 326 coupled to port 120 is a VLAN unaware device.

A further exemplary process of port forwarding in VLAN aware mode will now be described with respect to FIGS. 3l and 3m. According to this embodiment, the forwarding decision takes also into account whether the destination address is a unicast address or a non-unicast address such as a broadcast, multicast or reserved address. Distinguished from the exemplary process of port forwarding decision according to FIG. 3j, data packets with a destination address matching the unicast entry of the MAC table are not forwarded to port 120.

Referring to FIG. 3l, at S50, the data packet is received at port 110. AT S51, it is determined whether the destination address is a unicast address. If this is true, it is determined at S52 whether the destination address matches an entry in the MAC table. If this is true, it is determined at S53 whether port 130 is a member of this VLAN identification. If this is true, the data packet is forwarded at S54 to port 130 and the process ends at S545 If it is determined at S53 that port 130 is not a member of this VLAN ID, the process ends at S55. If it is determined at S52 that the destination is not a unicast entry in the MAC table, it is determined at S56 whether port 120 is a member of the VLAN identification of the data packet. If this is true, the data packet is forwarded at S57 to port 120, otherwise the process ends at S55. If it is determined at S51 that the destination address is not a unicast address, it is determined at S58 whether the VLAN identification matches an entry in the VLAN table. If this is not the case, the process ends at S55. If it is determined at S58 that the VLAN identification of the data packet matches an entry, it is determined whether port 120 is a member of this VLAN identification. If this is true, the data packet is forwarded to port 120 and the process proceeds to S61. Otherwise, the process proceeds directly to S61. At S61, it is determined whether the destination address is an non-unicast entry in the MAC table. If this is not the case, the process ends at S55. If the destination address is a non-unicast entry in the MAC table, it is determined at S62 shether port 130 is a member of the VLAN identification. If this is false, the process ends at S55, it this is true the data packet is forwarded to port 130 at S63 and the process ends at S55.

The forwarding rule of the above exemplary port decision process is shown in FIG. 4b. Compared to FIG. 4a it can be seen that the forwarding decision for non-unicast addresses is similar to the forwarding decision according to FIG. 4a while the forwarding decision for unicast addresses is distinguished from table 4a. In particular, data packets having a destination address matching the unicast address in the MAC table (DA) are forwarded only to port 130 when the port 130 is member of the VLAN ID (V1) and are discarded when the port 130 is not a member of the VLAN ID. Furthermore, data packets having a destination address not matching the unicast address in the MAC table are forwarded only to port 120 when port 120 is a member of the VLAN ID of the data packet (V2) and are otherwise discarded.

Figure 3M:
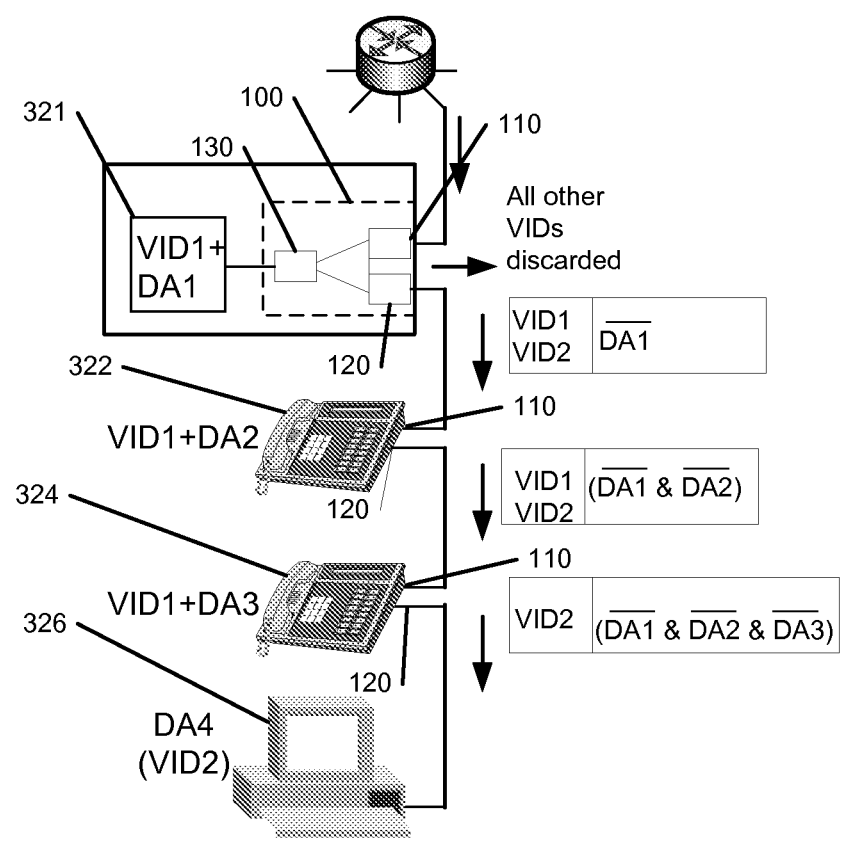

FIG. 3m shows implementation of the forwarding rule for a system corresponding to the system according to FIG. 3k. It is to be noted that data packet traffic from VoIP phone 320 to VoIP phone 322 contains data packets having either VLAN ID VID1 or VID2 and having a destination address not matching the unicast destination address DA1 (complement of DA1) while in the embodiment according to FIG. 3k the data traffic from VoIP phone 320 to 322 contained data packets having either VLAN ID VID1 or VID2 independent of the destination address. Thus, the forwarding rule according to FIG. 3l provides additional selection for port 120 and may reduce the amount of data traffic via port 120. This can be seen when observing the data traffic from VoIP phone 322 to 324 for this embodiment. Here from the data packets having VLAN identification VID1 or VID2 only the data packets having a destination address not matching the unicast destination address DA1 (complement of DA1) and not matching the unicast destination address DA2 (complement of DA2) are transferred to VoIP phone 324. Furthermore, the data traffic from VoIP phone 324 to device 326 contains from the data packets having VLAN identification VID2 only the data packets not matching the unicast addresses DA1, DA2 and DA3, respectively.

It is to be understood that the above described systems and forward decision processes are only exemplary and many variations may be provided in other embodiments. In particular, in the flow diagrams shown, steps may be interchanged or other flow diagrams may be used in order to achieve the same forwarding rule. In other exemplary systems and forwarding processes, only one VLAN identification VID1 may be provided in the VLAN tables or more than two VLAN identifications may be provided in the VLAN tables. Furthermore, the ports may be associated with other VLANs.

It is also to be noted that the each of the VLAN aware and each of the VLAN unaware forwarding processes may be provided together in the switching device. According to one embodiment, it may be determined whether the data packet received at port 110 is VLAN tagged or not and one of the above VLAN unaware or one of the above VLAN aware processes may be started accordingly.

Furthermore, while the forwarding process has been described with respect to data packets received at port 110, it is to be understood that the above forwarding process may be similar for data packets received at port 120 which are to be decided for forwarding to ports 110 and 130. However, while the process may be the same, it is to be noted that in the VLAN table and MAC table the entries associated with ports 110 and 120 may be different resulting in different forwarding decisions for data packets received at port 110 and port 120.

Referring back to FIG. 2, an exemplary operation of the prioritization entities will now be described.

According to one embodiment, prioritization at the prioritization entities associated with ports 110 and 120 is based on a static prioritization of the traffic transferred from port 130 to ports 110 and 120 over the traffic transferred between ports 110. It is to be noted that according to the embodiments shown in FIGS. 1 and 2, for each port two separate buffer memories are provided for storing the data packets to be transmitted to external devices or networks. In the above described prioritization, one of these buffer memories, i.e. buffers 150a and 150d, respectively, is provided for the high priority traffic from port 130, while one of these buffer memories, i.e. buffers 150f and 150c, respectively, is provided for the low priority traffic between ports 110 and 120. Thus, according to one embodiment, the structure of separate buffers allows for a simple prioritization by always giving traffic from port 130 priority over traffic between ports 110 and 120. To this end, the prioritization entity 162a at port 110 determines whether there is data of data packets transferred from port 130 in the high priority buffer 150a and transmits these data when present via port 110 while the low priority traffic from port 120 stored in buffer 150f is blocked during the transmission of the high priority data.

At port 120, the prioritization entity 162b determines whether there is data of data packets transferred from port 130 in the high priority buffer 150d and transmits these data when present via port 120 to external networks or devices while the low priority traffic from port 110 stored in buffer 150c is blocked during the transmission of the high priority data. According to embodiments, the high priority traffic is a time-critical traffic, for example voice packets and the above prioritization assures the provision of the time-critical traffic from the data sink/source connected to port 130 to data sink/sources of other external devices, for examples other VoIP phones. According to one embodiment, the data sink/source coupled to port 130, for example a CPU, may provide prioritization of traffic received at port 130, for example for voice data packets and non-voice data packets.

It is to be noted that according to embodiments, one of the ports 110 or port 120 may not provide prioritization for the data packets to be transmitted via this port. For example, according to one embodiment, the switching device includes only prioritization entity 162a, while entity 162b is not implemented. According to one implementation of this embodiment, the two buffers 150c and 150d provided for buffering data packets to be transmitted via port 120 may be replaced by a single buffer.

In the following, exemplary embodiments of flow controlling will be described. According to one embodiment, the flow control may be based on the monitoring of the filling levels of one or both of the separate buffers provided to store the externally received data packets at ports 110 and 120.

To this end, the flow control entity 166a comprises a flow control state machine coupled to the two buffers 150b, 150c dedicated to store the data packets externally received at port 110. Similar, the flow control entity 166b comprises a flow control state machine coupled to the two buffers 150e, 150f dedicated to store the data packets externally received at port 120.

According to one embodiment, the provision of separate buffer memories allows for a flow control with reduced complexity since only the filling levels of the respective buffers have to be monitored. For a data packet received at port 110, as outlined above, it may be determined based on the destination address of the data packet whether the data packet is stored in buffer 150b or buffer 150c or in both buffers 150b and 150c. If the destination address of the data packet matches the unicast address provided in the MAC table, i.e. the address associated with port 130, the data packet is determined to be stored only in the receive buffer 150b. In this case, the flow control is based only on the filling level of buffer 150b. As described above, data packets having a destination address which is not matching the unicast address provided in the MAC table may be stored only in the receive buffer 150c or in both receive buffers 150b and 150c dependent on whether the data packet is to be forwarded only to port 120 or to both ports 120 and 130. Reference is made to the above described embodiments. According to embodiments, the flow control machine 166a may be coupled to the filtering machine 164a to receive information indicating in which buffers the data packet is determined to be stored and to provide flow control based on this information and the filling level of the respective buffer or buffers.

It is to be noted that the above embodiments related to port forwarding, feedback control and prioritization may be provided independent of the buffer structure shown in FIGS. 1 and 2.

While embodiments have been described with respect to a 3-port switching device, it is to be understood that other embodiments may include more than 3 ports.

While embodiments have been described with respect to a VoIP phone, it is to be understood that other embodiments may include other devices such as home gateway devices.

What is claimed is:

1. A method for switching data packets between a first, second and third port comprising:
    receiving data packets at the first port;
    determining whether one or both of a destination address and a VLAN ID associated with the data packet matches an entry of a MAC address list and/or an entry in a VLAN table;
    in a first operation mode,
    transferring to the third port each data packet comprising a destination address matching one address of the MAC address list;
    transferring to the second port each data packet comprising a destination address not matching an address of the MAC address list;
    in a second operation mode,
    transferring to the third port each data packet comprising a VLAN ID matching an entry in the VLAN table associated with the third port and comprising a destination address matching one address of the MAC address list;
    transferring to the second port each data packet comprising a VLAN ID matching an entry in the VLAN table associated with the second port and comprising a destination address not matching an address of the MAC address list;

discarding each data packet assigned to a VLAN ID not matching an entry in the VLAN table; and discarding each data packet assigned to a VLAN ID not matching an entry in the VLAN table associated with the second port and comprising a destination address not matching an entry in the MAC address list.

2. The method according to claim 1, wherein the MAC address list comprises at least a predetermined unicast address.

3. The method according to claim 2, wherein the MAC address list further comprises at least one of a multicast address, a broadcast address and a reserved address.

4. The method according to claim 1, wherein the VLAN ID comprises at least one predetermined VLAN ID.

5. The method according to claim 1, further comprising: determining whether the data packet is VLAN tagged, if the data packet is VLAN tagged, entering the second operation mode, otherwise entering the first operation mode.

6. The method according to claim 5, further comprising in the first operation mode: determining whether the destination address of the data packet is a unicast address, and if the destination address of the data packet is not a unicast address, transferring the data packet to the second port.

7. The method according to claim 6, further comprising transferring the data packet to the second and third port, if the destination address of the data packet is a non-unicast address and the destination address matches an entry of the MAC address list associated with the third port.

8. The method according to claim 1, further comprising: transferring to the second port each data packet assigned to a VLAN ID matching an entry in the VLAN table associated with the second port independent of the destination address of the data packet.

* * * * *